United States Patent
Liang

(10) Patent No.: US 9,740,041 B2
(45) Date of Patent: Aug. 22, 2017

(54) LIQUID CRYSTAL DISPLAY COMPRISING A UNIDIRECTIONAL LIGHT GUIDE THIN FILM LOCATED ABOVE A COLOR LIGHT EMITTING LAYER COMPRISING A PLURALITY OF QUANTUM DOTS

(71) Applicant: Shenzhen China Star Optoelectronics Technology Co., Ltd., Shenzhen (CN)

(72) Inventor: Yuheng Liang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 176 days.

(21) Appl. No.: 14/787,769

(22) PCT Filed: Oct. 12, 2015

(86) PCT No.: PCT/CN2015/091723
§ 371 (c)(1),
(2) Date: Oct. 29, 2015

(87) PCT Pub. No.: WO2017/041345
PCT Pub. Date: Mar. 16, 2017

(65) Prior Publication Data
US 2017/0160585 A1    Jun. 8, 2017

(51) Int. Cl.
*G02F 1/1335* (2006.01)
*G02F 1/1368* (2006.01)

(52) U.S. Cl.
CPC ...... *G02F 1/133524* (2013.01); *G02F 1/1368* (2013.01); *G02F 1/133512* (2013.01);
(Continued)

(58) Field of Classification Search
CPC ......... G02F 1/133524; G02F 1/133617; G02F 2203/01; G02F 1/133621; G02F 2001/133531; G02F 2001/133614
See application file for complete search history.

(56) References Cited

U.S. PATENT DOCUMENTS

2012/0274882 A1* 11/2012 Jung ................. G02F 1/133617
349/96
2012/0287381 A1* 11/2012 Li ..................... G02F 1/133617
349/106

(Continued)

*Primary Examiner* — Paul Lee
(74) *Attorney, Agent, or Firm* — Leong C. Lei

(57) ABSTRACT

The present invention provides a liquid crystal display. By locating a color light emitting layer which is mainly manufactured with quantum dot material in the liquid crystal display panel, the color gamut performance of the liquid crystal display is promoted. Meanwhile, by locating the unidirectional light guide thin film at the illuminating side of the liquid crystal display panel, the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light. Thus, the issue that the contrast drops or even color shift happens because the traditional quantum dot display can be easily excited by the exterior light can be prevented to promote the display quality of the liquid crystal display.

15 Claims, 3 Drawing Sheets

(52) U.S. Cl.
CPC .. *G02F 1/133528* (2013.01); *G02F 1/133617* (2013.01); *G02F 1/133621* (2013.01); *G02F 2001/133531* (2013.01); *G02F 2001/133614* (2013.01); *G02F 2202/36* (2013.01); *G02F 2203/01* (2013.01)

(56) References Cited

U.S. PATENT DOCUMENTS

| | | | | |
|---|---|---|---|---|
| 2013/0258232 | A1* | 10/2013 | Zhou | G02F 1/133308 349/58 |
| 2013/0308337 | A1* | 11/2013 | Chang | G02B 5/0231 362/606 |
| 2013/0335677 | A1* | 12/2013 | You | G02F 1/133609 349/65 |
| 2014/0204128 | A1* | 7/2014 | Jiang | G02F 1/133617 345/690 |

\* cited by examiner

LIQUID CRYSTAL DISPLAY COMPRISING A UNIDIRECTIONAL LIGHT GUIDE THIN FILM LOCATED ABOVE A COLOR LIGHT EMITTING LAYER COMPRISING A PLURALITY OF QUANTUM DOTS

FIELD OF THE INVENTION

The present invention relates to a display technology field, and more particularly to a liquid crystal display.

BACKGROUND OF THE INVENTION

The LCD (Liquid Crystal Display) possesses advantages of thin body, power saving and no radiation to be widely used in many application scope. It has been widely utilized in, such as mobile phones, PDAs (personal digital assistance), digital cameras, laptop screens or notebook screens. Generally, the liquid crystal display comprises a shell, a LCD panel located in the shell and a backlight module located in the shell. Particularly, the structure of the LCD panel mainly comprise a TFT Array Substrate (Thin Film Transistor Array Substrate), a CF (Color Filter) and a Liquid Crystal Layer. The working principle is that the light of backlight module is reflected to generate images by applying driving voltages to the two glass substrate for controlling the rotations of the liquid crystal molecules.

The Quantum Dots (QDs) material means the semiconductor crystalline grain with grain diameter of 1-100 nm. The grain diameter of the quantum dots material is smaller than or close to the bulk exciton Bohr radius of the appropriate body, and the quantum confinement effect occurs. The level structure is changed from the quasi continuous change of the body material to the discrete structure of the quantum dot material and results in that the quantum dots show particular light emitting performance of the excitation light emission. Along with the size decrease of the quantum dot, the energy band gap increases. Both the required energy of exciting corresponding quantum dot and the energy released by the quantum dot backing to the ground state after the excitation are correspondingly magnified It appears to be the quantum dot excitation and the spectrum blue shift phenomenon of the fluorescence spectrum. By controlling the size of the quantum dot, the narrow full width at half maximum of the light spectrum can cover the entire range of the visible light. For example, the size of the CdSe quantum dot is decreased from 6.6 nm to 2.0 nm. The emission wavelength is blue shifted from the red light range 635 nm to the blue light range 460 nm.

The quantum dot material possesses advantages of controllable emission wavelength, narrow full width at half maximum. The present application technology of the quantum dot material is to utilize a color light emitting layer manufactured with quantum dots of various emission wavelengths to replace the color filter in the liquid crystal display. Thus, the defect of the spectrum distribution of the blue light LED plus yellow phosphor can be resolved to raise the color gamut of the display; however, the color light emitting layer is located at the position which is close to the exterior of the liquid crystal display. The exterior light may excites the quantum dots. Therefore, the contrast of the display in the bright environment will drop and the color shift phenomenon may happen.

SUMMARY OF THE INVENTION

An objective of the present invention is to provide a liquid crystal display. A color light emitting layer which is mainly manufactured with quantum dot material is employed to replace the traditional color light emitting layer. Meanwhile, by locating the unidirectional light guide thin film at the illuminating side of the liquid crystal display panel, exterior light cannot enters the liquid crystal display panel to excite the quantum dots to emit light. Thus, the issue of the display that the contrast drops or even color shift happens because the quantum dots are excited by the exterior light can be prevented.

For realizing the aforesaid objective, the present invention provides a liquid crystal display, comprising a liquid crystal display panel and a backlight source; the liquid crystal display panel comprises an upper substrate and a lower substrate which are oppositely located and a liquid crystal layer located between the upper substrate and the lower substrate;

the upper substrate comprises a first substrate, a color light emitting layer located above the first substrate, an unidirectional light guide thin film located above the color light emitting layer, an upper polarizer located under the first substrate and a first alignment film located under the polarizer;

the lower substrate comprises a second substrate, a lower polarizer located under the second substrate, a thin film transistor layer located above the second substrate and a second alignment film located above the thin film transistor layer;

the color light emitting layer comprises a plurality of red sub pixel areas, a plurality of green sub pixel areas and a plurality of blue sub pixel areas, and the red sub pixel area comprises red quantum dots of emission wavelength 610-650 nm, and the green sub pixel area comprises green quantum dots of emission wavelength 510-540 nm, and the blue sub pixel area comprises blue quantum dots of emission wavelength 410-440 nm or the blue sub pixel area comprises transparent material, and the red, green, blue sub pixel areas of the color light emitting layer respectively emit red, green, blue lights under irradiation of light emitted by the backlight source;

the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light.

The backlight source is a blue light source or an ultraviolet light source.

The blue sub pixel area comprises quantum dots of emission wavelength 410-440 nm, and the backlight source is an ultraviolet light source, and the red, green, blue quantum dots in the red, green, blue sub pixel areas emit the red, green, blue lights respectively under irradiation of ultraviolet light.

The blue sub pixel area comprises transparent material, and the backlight source is a blue light source, and the red quantum dots in the red sub pixel area and the green quantum dots in the green sub pixel area respectively emit red light and green light under excitation of the blue light, and the blue light passes through the transparent material of the blue sub pixel area, and the blue light emits in the blue sub pixel area.

Material of the red quantum dots, the green quantum dots and the blue quantum dots is one or more of II-VI elements quantum dot material, III-V elements quantum dot material and I-III-VI elements quantum dot material.

Material of the red quantum dots, the green quantum dots and the blue quantum dots is one or more of CdSe, CdS, CdTe, ZnS, ZnSe, CuInS, ZnCuInS.

A polarization direction of the upper polarizer and a polarization direction of the lower polarizer are mutually perpendicular or parallel.

The liquid crystal display further comprises a black matrix, and the black matrix is located in the upper substrate or the lower substrate, or in both of the upper substrate and the lower substrate.

Both the first substrate and the second substrate are transparent substrates.

The unidirectional light guide thin film comprises a light guiding surface and an illuminating surface, and the light guiding surface comprises a plurality of beads which are abreast and continuous, and a top of the bead comprises a sharp corner reflective part, and two reflective surfaces of the sharp corner reflective part are fitted with two inclined surfaces of the bead, and the illuminating surface is a smooth surface; the light guiding surface is located close to the color light emitting layer.

The present invention further provides a liquid crystal display, comprising a liquid crystal display panel and a backlight source; the liquid crystal display panel comprises an upper substrate and a lower substrate which are oppositely located and a liquid crystal layer located between the upper substrate and the lower substrate;

the upper substrate comprises a first substrate, a color light emitting layer located above the first substrate, an unidirectional light guide thin film located above the color light emitting layer, an upper polarizer located under the first substrate and a first alignment film located under the polarizer;

the lower substrate comprises a second substrate, a lower polarizer located under the second substrate, a thin film transistor layer located above the second substrate and a second alignment film located above the thin film transistor layer;

the color light emitting layer comprises a plurality of red sub pixel areas, a plurality of green sub pixel areas and a plurality of blue sub pixel areas, and the red sub pixel area comprises red quantum dots of emission wavelength 610-650 nm, and the green sub pixel area comprises green quantum dots of emission wavelength 510-540 nm, and the blue sub pixel area comprises blue quantum dots of emission wavelength 410-440 nm or the blue sub pixel area comprises transparent material, and the red, green, blue sub pixel areas of the color light emitting layer respectively emit red, green, blue lights under irradiation of light emitted by the backlight source;

the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light;

wherein the backlight source is a blue light source, a white light source or an ultraviolet light source;

wherein a polarization direction of the upper polarizer and a polarization direction of the lower polarizer are mutually perpendicular or parallel;

wherein the liquid crystal display further comprises a black matrix, and the black matrix is located in the upper substrate or the lower substrate, or in both of the upper substrate and the lower substrate;

wherein both the first substrate and the second substrate are transparent substrates;

wherein the unidirectional light guide thin film comprises a light guiding surface and an illuminating surface, and the light guiding surface comprises a plurality of beads which are abreast and continuous, and a top of the bead comprises a sharp corner reflective part, and two reflective surfaces of the sharp corner reflective part are fitted with two inclined surfaces of the bead, and the illuminating surface is a smooth surface; the light guiding surface is located close to the color light emitting layer.

The benefits of the present invention are: the present invention provides a liquid crystal display. By locating a color light emitting layer which is mainly manufactured with quantum dot material in the liquid crystal display panel, the color gamut performance of the liquid crystal display is promoted. Meanwhile, by locating the unidirectional light guide thin film at the illuminating side of the liquid crystal display panel, the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light. Thus, the issue that the contrast drops or even color shift happens because the traditional quantum dot display can be easily excited by the exterior light can be prevented to promote the display quality of the liquid crystal display.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
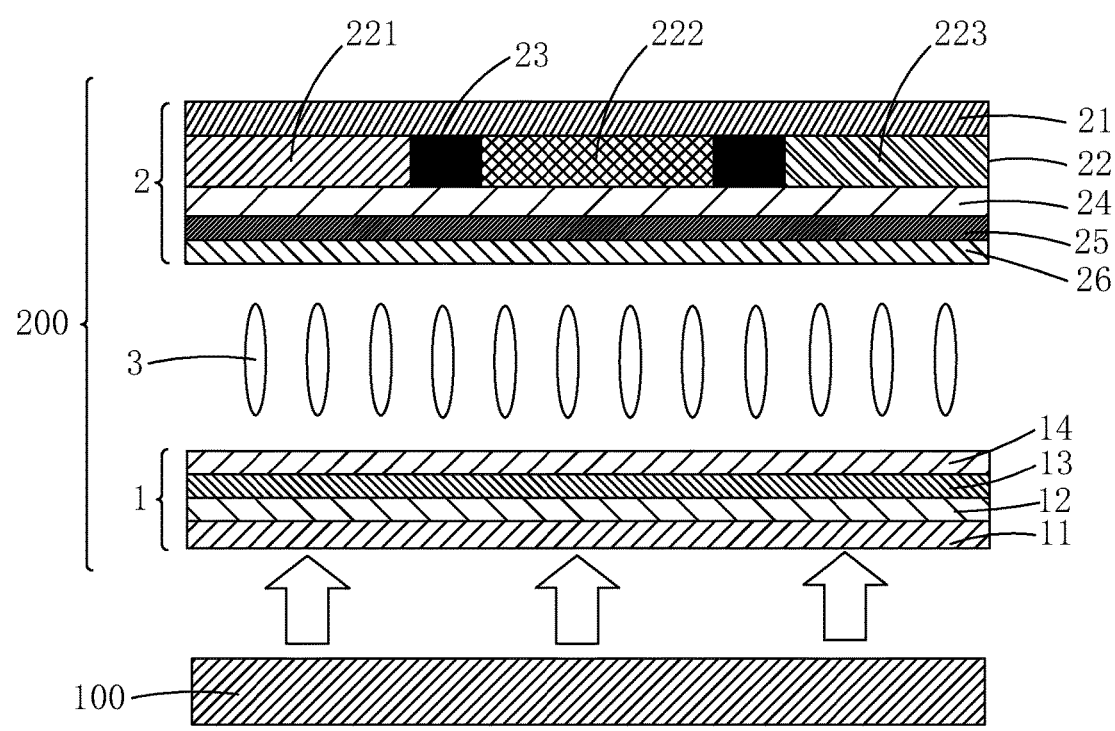
FIG. 1 is a structure diagram of the first embodiment according to the liquid crystal display of the present invention.
Figure 2:
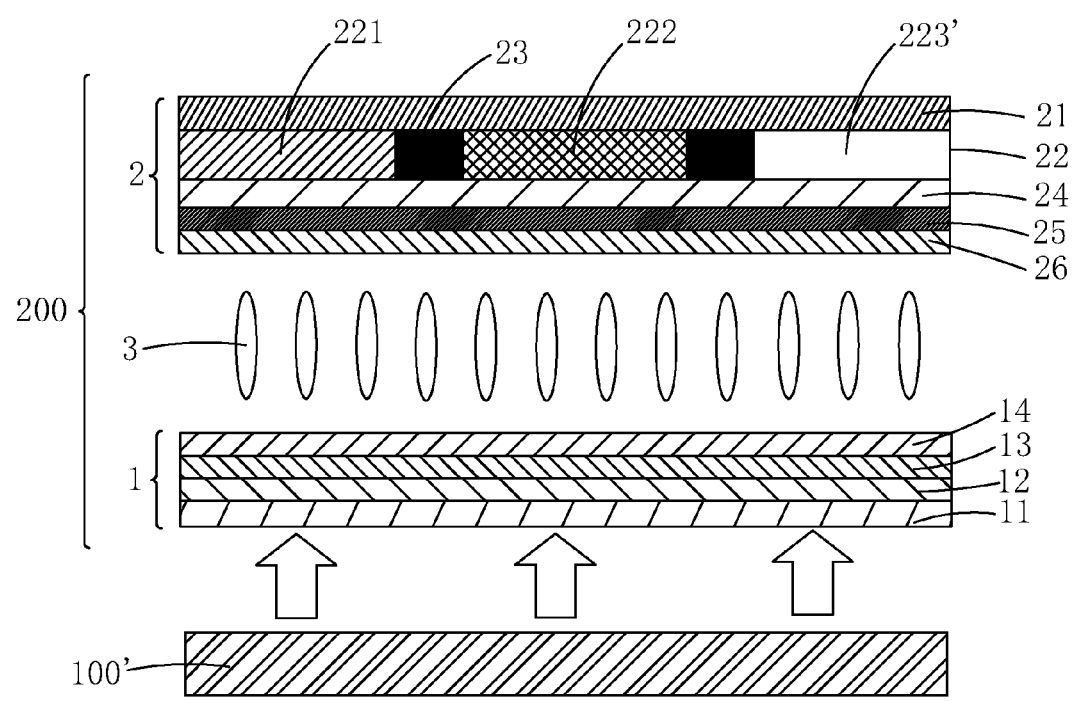
FIG. 2 is a structure diagram of the second embodiment according to the liquid crystal display of the present invention.

Please refer to FIGS. 1-2. The present invention provides a liquid crystal display, comprising a liquid crystal display panel 200 and a backlight source 100/100'; the liquid crystal display panel 200 comprises an upper substrate 2 and a lower substrate 1 which are oppositely located and a liquid crystal layer 3 located between the upper substrate 2 and the lower substrate 1;

the upper substrate 2 comprises a first substrate 24, a color light emitting layer 22 located above the first substrate 24, an unidirectional light guide thin film 21 located above the color light emitting layer 22, an upper polarizer 25 located under the first substrate 24 and a first alignment film 26 located under the polarizer 25;

the lower substrate 1 comprises a second substrate 12, a lower polarizer 11 located under the second substrate 12, a thin film transistor layer 13 located above the second substrate 12 and a second alignment film 14 located above the thin film transistor layer 13;

the color light emitting layer 22 comprises a plurality of red sub pixel areas 221, a plurality of green sub pixel areas 222 and a plurality of blue sub pixel areas 223/223', and the red sub pixel area 221 comprises red quantum dots of emission wavelength 610-650 nm, and the green sub pixel area 222 comprises green quantum dots of emission wavelength 510-540 nm, and the blue sub pixel area 223/223' comprises blue quantum dots of emission wavelength 410-440 nm or the blue sub pixel area 223/223' comprises transparent material, and the red, green, blue sub pixel areas 221, 222, 223/223' of the color light emitting layer 222 respectively emit red, green, blue lights under irradiation of light emitted by the backlight source 100/100';

the lights emitted from the color light emitting layer 22 can propagate outward through the unidirectional light guide thin film 21, but exterior light is blocked and reflected by the unidirectional light guide thin film 21 and cannot propagate to the color light emitting layer 22 to excite the quantum dots to emit light.

Specifically, the backlight source 100/100' is a blue light source or an ultraviolet light source.

As shown in FIG. 1, which shows the first embodiment of the liquid crystal display according to the present invention, in this embodiment, the blue sub pixel area 223 comprises quantum dots of emission wavelength 410-440 nm, and the backlight source 100 is an ultraviolet light source, and the red, green, blue quantum dots in the red, green, blue sub pixel areas 221, 222, 223 emit the red, green, blue lights respectively under irradiation of ultraviolet light.

As shown in FIG. 2, which shows the second embodiment of the liquid crystal display according to the present invention, in this embodiment, the blue sub pixel area 223' comprises transparent material, and the backlight source 100' is a blue light source, and the red quantum dots in the red sub pixel area 221 and the green quantum dots in the green sub pixel area 222 respectively emit red light and green light under excitation of the blue light, and the blue light passes through the transparent material of the blue sub pixel area 223', and the blue light emits in the blue sub pixel area 223'.

Preferably, the transparent material is transparent photoresist.

Specifically, material of the red quantum dots, the green quantum dots and the blue quantum dots is one or more of II-VI elements quantum dot material, III-V elements quantum dot material and I-III-VI elements quantum dot material.

Preferably, material of the red quantum dots, the green quantum dots and the blue quantum dots is one or more of CdSe, CdS, CdTe, ZnS, ZnSe, CuInS, ZnCuInS.

Specifically, a polarization direction of the upper polarizer 25 and a polarization direction of the lower polarizer 11 are mutually perpendicular or parallel; as the polarization direction of the upper polarizer 25 and the polarization direction of the lower polarizer 11 are mutually perpendicular, the liquid crystal display is the normal black mode; as the polarization direction of the upper polarizer 25 and the polarization direction of the lower polarizer 11 are mutually parallel, the liquid crystal display is the normal white mode.

Specifically, the liquid crystal display further comprises a black matrix 23, and the black matrix 23 is located in the upper substrate 2 or the lower substrate 1, or in both of the upper substrate 2 and the lower substrate 1.

Specifically, both the first substrate 24 and the second substrate 12 are transparent substrates. Preferably, both the first substrate 24 and the second substrate 12 are glass substrates.

Figure 3:
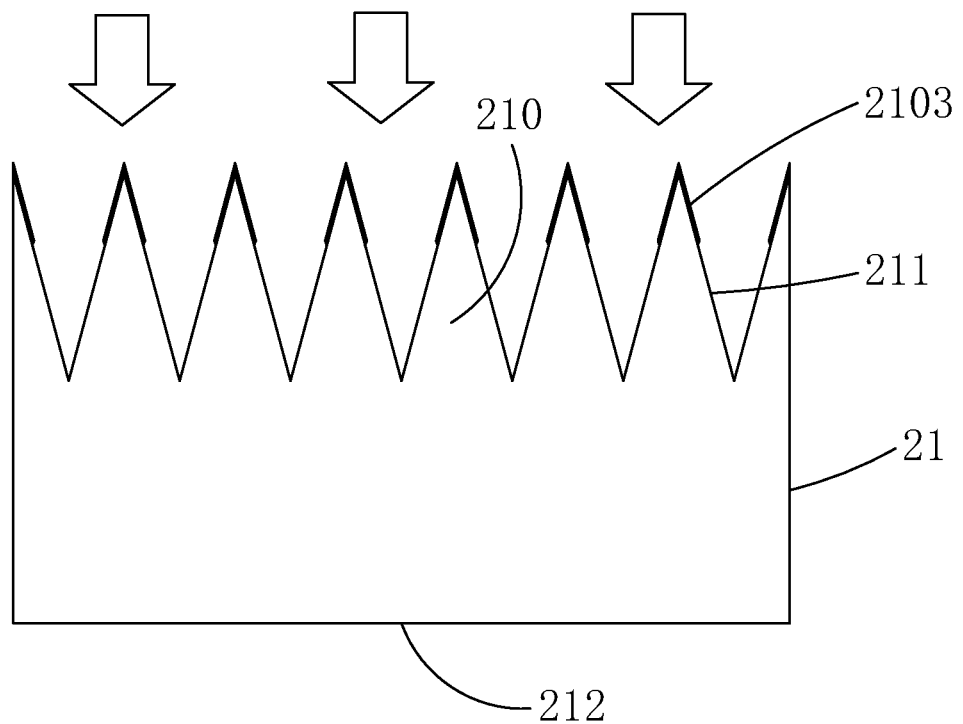
FIG. 3 is sectional structure diagram of the unidirectional light guide thin film in the liquid crystal display of the present invention.

As shown in FIG. 3, the unidirectional light guide thin film 21 comprises a light guiding surface 211 and an illuminating surface 212, and the light guiding surface 211 comprises a plurality of beads 210 which are abreast and continuous, and a top of the bead 210 comprises a sharp corner reflective part 2103, and two reflective surfaces of the sharp corner reflective part 2103 are fitted with two inclined surfaces of the bead 210, and the illuminating surface 212 is a smooth surface. Specifically, the light guiding surface 211 is located close to the color light emitting layer 22.

Specifically, the sharp corner reflective part 2103 is a metal reflective layer, and material of the metal can be aluminum, silver or titanium.

Specifically, the working principle of the unidirectional light guide thin film 21 is: the light irradiates on the light guiding surface 211 from the optically thinner medium, and enters the unidirectional light guide thin film 21 after the reflection and refraction of the light guiding surface 211 and exits through the illuminating surface 212, and the direction is the light guiding direction of the unidirectional light guide thin film 21; the light enters the unidirectional light guide thin film 21 from the illuminating surface 212, and irradiates on the light guiding surface 211, and is reflected by the light guiding surface 211 and exist through the illuminating surface 212, and the direction is the light blocking direction of the unidirectional light guide thin film 21. By locating the sharp corner reflective part 2103 at the top of the beads 210 on the light guiding surface 211, and adjusting the sharp corner angle, the unidirectional light guide thin film 21 makes the light in the light guiding direction of the unidirectional light guide thin film 21 enters into the other side, and the light in the light blocking direction of the unidirectional light guide thin film 21 is reflected due to the total reflection and the reflective layer to achieve the unidirectional light guide.

In conclusion, the present invention provides a liquid crystal display. By locating a color light emitting layer which is mainly manufactured with quantum dot material in the liquid crystal display panel, the color gamut performance of the liquid crystal display is promoted. Meanwhile, by locating the unidirectional light guide thin film at the illuminating side of the liquid crystal display panel, the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light. Thus, the issue that the contrast drops or even color shift happens because the traditional quantum dot display can be easily excited by the exterior light can be prevented to promote the display quality of the liquid crystal display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display, comprising a liquid crystal display panel and a backlight source; the liquid crystal display panel comprises an upper substrate and a lower substrate which are oppositely located and a liquid crystal layer located between the upper substrate and the lower substrate;

the upper substrate comprises a first substrate, a color light emitting layer located above the first substrate, an unidirectional light guide thin film located above the color light emitting layer, an upper polarizer located under the first substrate and a first alignment film located under the polarizer;

the lower substrate comprises a second substrate, a lower polarizer located under the second substrate, a thin film transistor layer located above the second substrate and a second alignment film located above the thin film transistor layer;

the color light emitting layer comprises a plurality of red sub pixel areas, a plurality of green sub pixel areas and a plurality of blue sub pixel areas, and the red sub pixel area comprises red quantum dots of emission wavelength 610-650 nm, and the green sub pixel area comprises green quantum dots of emission wavelength 510-540 nm, and the blue sub pixel area comprises blue quantum dots of emission wavelength 410-440 nm or the blue sub pixel area comprises transparent material, and the red, green, blue sub pixel areas of the color light emitting layer respectively emit red, green, blue lights under irradiation of light emitted by the backlight source;

the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light.

2. The liquid crystal display according to claim 1, wherein the backlight source is a blue light source, a white light source or an ultraviolet light source.

3. The liquid crystal display according to claim 1, wherein the blue sub pixel area comprises quantum dots of emission wavelength 510-540 nm, and the backlight source is an ultraviolet light source, and the red, green, blue quantum dots in the red, green, blue sub pixel areas emit the red, green, blue lights respectively under irradiation of ultraviolet light.

4. The liquid crystal display according to claim 1, wherein the blue sub pixel area comprises transparent material, and the backlight source is a blue light source, and the red quantum dots in the red sub pixel area and the green quantum dots in the green sub pixel area respectively emit red light and green light under excitation of the blue light, and the blue light passes through the transparent material of the blue sub pixel area, and the blue light emits in the blue sub pixel area.

5. The liquid crystal display according to claim 1, wherein material of the red quantum dots, the green quantum dots and the blue quantum dots is one or more of II-VI elements quantum dot material, III-V elements quantum dot material and I-III-VI elements quantum dot material.

6. The liquid crystal display according to claim 5, wherein material of the red quantum dots, the green quantum dots and the blue quantum dots is one or more of CdSe, CdS, CdTe, ZnS, ZnSe, CuInS, ZnCuInS.

7. The liquid crystal display according to claim 1, wherein a polarization direction of the upper polarizer and a polarization direction of the lower polarizer are mutually perpendicular or parallel.

8. The liquid crystal display according to claim 1, wherein the liquid crystal display further comprises a black matrix, and the black matrix is located in the upper substrate or the lower substrate, or in both of the upper substrate and the lower substrate.

9. The liquid crystal display according to claim 1, wherein both the first substrate and the second substrate are transparent substrates.

10. The liquid crystal display according to claim 1, wherein the unidirectional light guide thin film comprises a light guiding surface and an illuminating surface, and the light guiding surface comprises a plurality of beads which are abreast and continuous, and a top of the bead comprises a sharp corner reflective part, and two reflective surfaces of the sharp corner reflective part are fitted with two inclined surfaces of the bead, and the illuminating surface is a smooth surface; the light guiding surface is located close to the color light emitting layer.

11. A liquid crystal display, comprising a liquid crystal display panel and a backlight source; the liquid crystal display panel comprises an upper substrate and a lower substrate which are oppositely located and a liquid crystal layer located between the upper substrate and the lower substrate;

the upper substrate comprises a first substrate, a color light emitting layer located above the first substrate, an unidirectional light guide thin film located above the color light emitting layer, an upper polarizer located under the first substrate and a first alignment film located under the polarizer;

the lower substrate comprises a second substrate, a lower polarizer located under the second substrate, a thin film transistor layer located above the second substrate and a second alignment film located above the thin film transistor layer;

the color light emitting layer comprises a plurality of red sub pixel areas, a plurality of green sub pixel areas and a plurality of blue sub pixel areas, and the red sub pixel area comprises red quantum dots of emission wavelength 610-650 nm, and the green sub pixel area comprises green quantum dots of emission wavelength 510-540 nm, and the blue sub pixel area comprises blue quantum dots of emission wavelength 410-440 nm or the blue sub pixel area comprises transparent material, and the red, green, blue sub pixel areas of the color light emitting layer respectively emit red, green, blue lights under irradiation of light emitted by the backlight source;

the lights emitted from the color light emitting layer can propagate outward through the unidirectional light guide thin film, and exterior light is blocked and reflected by the unidirectional light guide thin film and cannot propagate to the color light emitting layer to excite the quantum dots to emit light;

wherein the backlight source is a blue light source, a white light source or an ultraviolet light source;

wherein a polarization direction of the upper polarizer and a polarization direction of the lower polarizer are mutually perpendicular or parallel;

wherein the liquid crystal display further comprises a black matrix, and the black matrix is located in the upper substrate or the lower substrate, or in both of the upper substrate and the lower substrate;

wherein both the first substrate and the second substrate are transparent substrates;

wherein the unidirectional light guide thin film comprises a light guiding surface and an illuminating surface, and the light guiding surface comprises a plurality of beads which are abreast and continuous, and a top of the bead comprises a sharp corner reflective part, and two reflective surfaces of the sharp corner reflective part are fitted with two inclined surfaces of the bead, and the illuminating surface is a smooth surface; the light guiding surface is located close to the color light emitting layer.

12. The liquid crystal display according to claim 11, wherein the blue sub pixel area comprises quantum dots of emission wavelength 510-540 nm, and the backlight source is an ultraviolet light source, and the red, green, blue quantum dots in the red, green, blue sub pixel areas emit the red, green, blue lights respectively under irradiation of ultraviolet light.

13. The liquid crystal display according to claim 11, wherein the blue sub pixel area comprises transparent material, and the backlight source is a blue light source, and the red quantum dots in the red sub pixel area and the green quantum dots in the green sub pixel area respectively emit red light and green light under excitation of the blue light, and the blue light passes through the transparent material of the blue sub pixel area, and the blue light emits in the blue sub pixel area.

14. The liquid crystal display according to claim 11, wherein material of the red quantum dots, the green quantum dots and the blue quantum dots is one or more of II-VI elements quantum dot material, III-V elements quantum dot material and I-III-VI elements quantum dot material.

15. The liquid crystal display according to claim 14, wherein material of the red quantum dots, the green quantum dots and the blue quantum dots is one or more of CdSe, CdS, CdTe, ZnS, ZnSe, CuInS, ZnCuInS.

* * * * *